Sept. 26, 1933.  L. E. TAYLOR  1,928,235
APPARATUS FOR TREATING FILMS
Filed Oct. 7, 1930   2 Sheets-Sheet 1
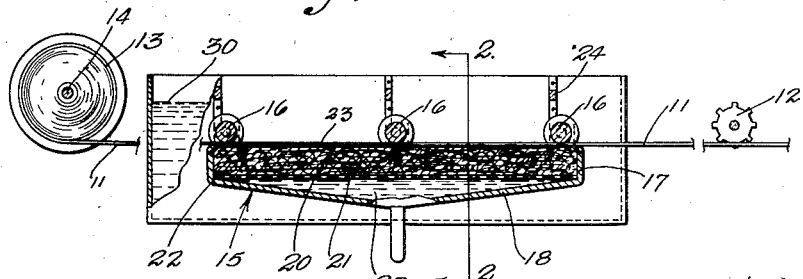
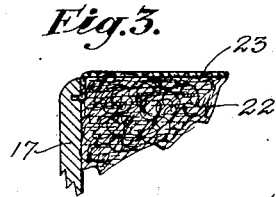
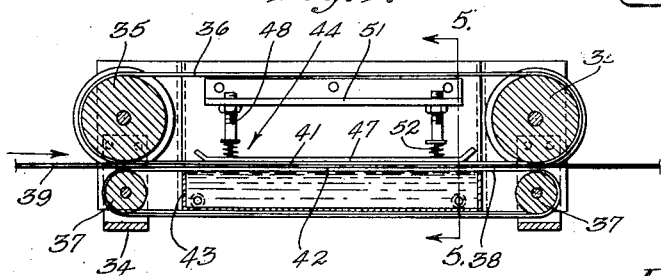
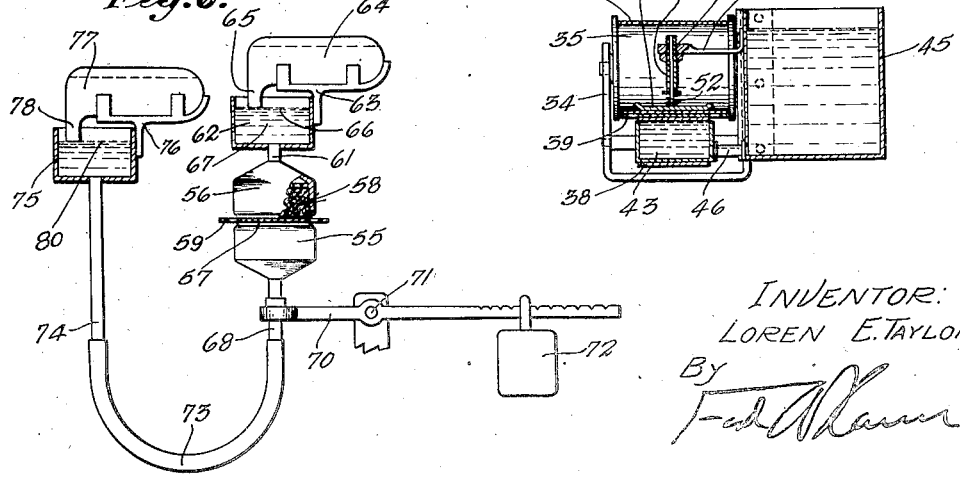
INVENTOR:
LOREN E. TAYLOR,
By
ATTORNEY.

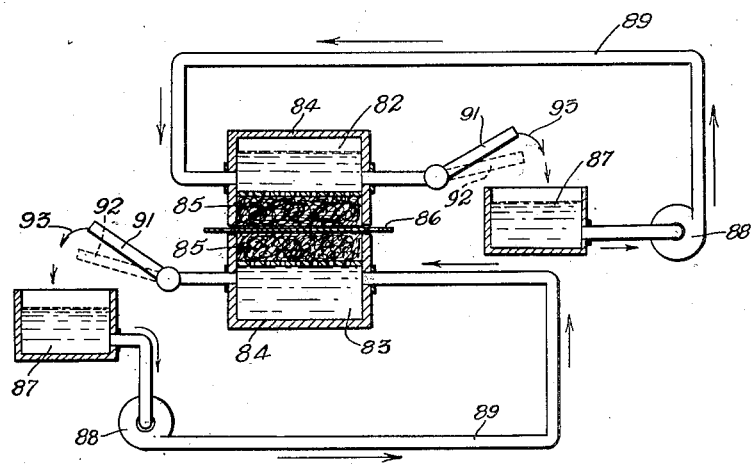
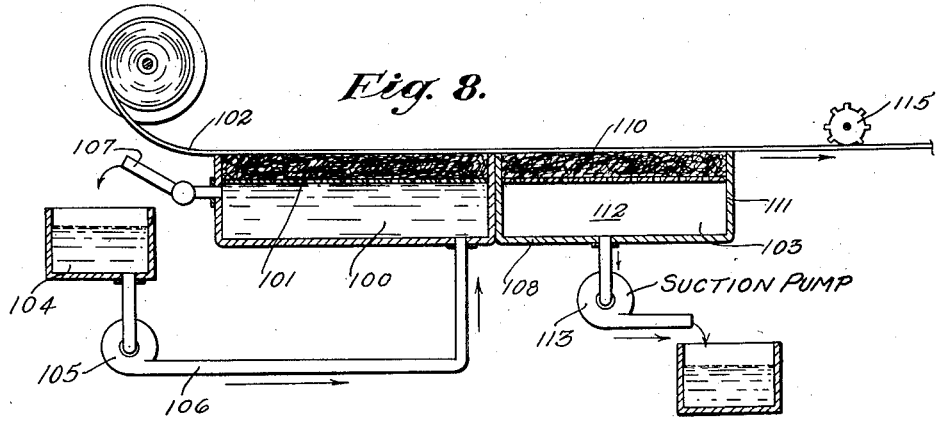

Patented Sept. 26, 1933

1,928,235

UNITED STATES PATENT OFFICE 1,928,235

APPARATUS FOR TREATING FILMS

Loren E. Taylor, Los Angeles, Calif., assignor, by mesne assignments, to Hughes Industries Co. Ltd., Los Angeles, Calif., a corporation of California Application October 7, 1930. Serial No. 486,977

11 Claims. (Cl. 95—94)

My invention relates to a simple machine for automatically treating motion picture film during the various operations which are performed thereon in the making of a photographic record for a motion picture production. In the production of motion picture film, a film strip is employed having a sensitized emulsion thereon which is exposed or printed with a light image of varying density. After exposure, the emulsion is developed, fixed, and washed, and if the film is to be colored, the image is treated with solutions for converting or dyeing it to the desired color. My invention is suitable for use in the various treatments which are performed on the emulsion of a motion picture film in the production of the complete positive, although the invention may be of greater utility and value in one type of treatment than in other types of treatment. For the purpose of disclosing my invention in a simple, yet fully comprehensive manner, I shall hereinafter describe the practice of same in the coloring of a motion picture color positive, it being understood that the description is suggestive of the various equivalent uses of the invention.

It is an object of my invention to provide an apparatus wherein film treating solutions may be efficiently, expeditiously, and economically applied in a manner to produce results comparable to those now accomplished by the use of expensive and complex equipment and processes.

My invention comprehends a device having means for moving a motion picture film through a prescribed path of movement, and simple and efficient appliers for applying treating solutions to the film as the film is carried through the machine. These appliers are equipped with bodies of pervious material, such as felts or other fibrous fabrics, held against the film as it is moved, and connected with suitable means for supplying the treating solutions to the pervious bodies in such a manner that the solutions will be evenly and efficiently applied to the surface of the film and to the coatings of said film.

It is an object of the invention to provide a device of this character having means for applying a solution to the appliers under a controlled pressure so that a constant and even feeding of the solution to the surface of the film may be maintained.

It is a further object of the invention to provide a device of this character having pressure exerting means for holding the appliers and the film being treated together in an operative manner.

A further object of the invention is to provide a simple form of film treating device incorporating the features hereinbefore mentioned, adapted to treat both surfaces of the film simultaneously.

A further object of the invention is to provide a device of this character having a solution applier of the type hereinabove designated, and having an efficient means for removing surplus solution from the surface of the film after the film has left the applier.

My invention also includes an apparatus for treating the emulsion coating of a film by placing a pervious material in engagement therewith and saturating the pervious material with the treating solution so that the solution will be transferred from the pervious material to the surface of the film.

A further object of the invention is to provide an apparatus for treating film, in which the treating solutions are applied with a massaging action, which increases the effectiveness and likewise reduces the time of treatment.

Further objects and advantages of the invention will be made evident throughout the following part of the specification.

Referring to the drawings, which are for illustrative purposes only,

Fig. 1 is a partly sectioned elevational view showing a simple form of my invention.

Fig. 2 is a cross section on a plane represented by the line 2—2 of Fig. 1.

Fig. 3 is a fragmentary cross sectional detail showing a simple construction which may be employed in making the permeable element of the solution applier forming part of the invention.

Fig. 4 is a partly sectioned elevational view showing a form of my invention in which the permeable solution applying element is movable.

Fig. 5 is a cross section on a plane represented by the line 5—5 of Fig. 4.

Fig. 6 is a diagrammatic, partly sectioned elevational view showing my invention in a form suitable for applying treating solutions simultaneously to both sides of a film, such as a double coated film.

Fig. 7 is a partly sectioned diagrammatic view showing a simple form of my invention in which the treating solutions are maintained in constant circulation and at substantially constant pressure.

Fig. 8 shows a form of my invention including a simple and effective means for removing surplus solution from the film after it has left the solution applier.

In the device shown in Figs. 1 to 3, I show diagrammatically a means for moving a film 11 through a predetermined path, this means including a pulling sprocket 12 which is preferably driven by a motor, not shown. At 13 I show a spool or film reel mounted on a shaft 14, from which spool the film 11 is drawn across an applier 15 and passes under rollers 16. The applier 15 includes walls 17 forming a chamber member 18 having an opening in the upper portion thereof in which a pervious or penetrable body or wall 20 is supported. This pervious wall 20 includes a perforated supporting wall 21, a body of fibrous or felted material 22 thereon, and a surface portion 23 which, as shown in Fig. 3, may consist of a sheet of chamois which is also a permeable or pervious material but is of much smoother and finer texture than the fibrous or felted layer of material 22. I have shown the rollers 16 supported by brackets 24 which are secured to the side of a storage or fluid supply container 25 which connects through a pipe 26 with the lower portion of the chamber member 18 and conducts fluid from the container 25 into the space 27 within the applier 15 so that such fluid will be brought into contact with the inner portion of the pervious wall 20 and will pass outwardly through the pervious wall and be applied to the lower surface of the film 11. The container 25 is quite large, and the fluid or treating solution 28 is placed therein to a level 30 sufficiently above the pervious wall 20 of the applier to exert a pressure on the fluid in the space 27 which will assist the capillary action within the pervious wall 20 in carrying the fluid to the film 11. This device may be employed in applying various treating solutions or compounds to the emulsion of a motion picture film to accomplish a desired chemical change or condition to be produced therein. For instance, in the coloring of a motion picture positive one of the color image carrying emulsions may be colored blue-green by converting the silver image to this color by placing a coloring solution in the container 25, which coloring solution will then pass through the pipe 26 and the space 27 to the pervious wall 20 of the applier 15 and will be applied to the emulsion coating of the film as the film is drawn over the chamois surface portion 23 at a proper velocity. I find that the treating results are improved by the massaging, rubbing, or kneading action produced in drawing the film over the chamois 23. The rollers 16 have trunnions 31 which are held in vertical slots 32 in the brackets 24 so as to permit a limited vertical movement of the rollers and to permit the weight of the rollers to hold the film in engagement with the applier 15 with the proper amount of pressure. As shown in Fig. 2, the width of the applier may be made so as to engage a desired portion of the surface of the film 11, thereby making it possible to limit the width of the strip portion of the film to which the solution is applied. This feature of the invention is of value in the treatment of films having a sound track along the edge, as it makes it possible to color the image carrying portion of the emulsion without changing the striations of the sound track from their original condition.

In Figs. 4 and 5 I show a simple form of device in which the permeable film engaging element is movable, and therefore it does not apply friction to the film. In this form of the device I provide brackets 34 which carry upper rollers 35 over which an upper belt 36 is carried, and lower rollers 37 which carry a movable permeable member 38 which is made in the form of a belt. The rollers 35 and 37 are placed in such adjacent positions that a film 39 which is to be treated may be carried through the space between the lower portion 41 of the upper belt 36 and the upper portion 42 of the permeable member 38, in the manner shown. Under the upper portion 42 of the permeable member 38 I place a fluid feeding member 43 having the upper portion thereof open and in contact with the under surface of the portion 42, and above the lower portion 41 of the belt 36 I place a pressure exerting means 44 for forcing the lower portion 41 and the intervening film 39 down against the upper portion 42 of the permeable member 38 so as to produce the desired contact between the permeable member 38 and the lower face of the film 39. A fluid container 45 is provided and is connected to the interior of the fan-shaped feeding member 43 through conduits 46 so that from the container 45 a desired treating solution or fluid will be delivered to the under surface of the upper portion 42 of the permeable member 38, this fluid passing through the permeable member and being applied to the lower surface of the film 39. The pressure exerting means 44 is shown as consisting of a plate 47 having posts 48 which extend upwardly therefrom into vertical sleeves 49 which are carried by brackets 51, the engagement of the posts 48 with the sleeves 49 preventing lateral movement of the plate 47 but permitting vertical movement thereof. Springs 52 exert a continuous downward pressure on the plate so as to force the plate against the lower portion 41 of the belt 36. The belt 36 and the member 38 may be moved at the same rate of speed in applying a liquid to the film 39, or the speed of the permeable member 38 may be increased or retarded so as to provide a wiping movement of the permeable member 38 with the under surface of the film 39 where the treatment requires a wiping or massaging effect. The form of the invention shown in Figs. 4 and 5 is adapted to the various treatments which must be given a finished film during its production, such as the applying of a developing solution, a fixative, a mordant, or coloring solution.

In the form of the invention shown in Fig. 6 I employ a lower applier 55 and an upper applier 56, these appliers including permeable walls 57 and 58 for respectively engaging the lower and upper surfaces or emulsions of a film 59. The appliers 55 and 56 are of substantially the same construction as the applier 15 shown in Figs. 1 to 3 with the exception that the upper applier 56 is in inverted position. Connected to the applier 56 by means of a conduit 61 is a fluid container 62 carrying a bracket 63 adapted to support an inverted fluid vessel 64 having a single downwardly directed outlet 65, the lower end of which outlet is positioned at the liquid level 66 at which it is desired to maintain a body of fluid 67 in the container 62. The applier 55 is provided with a downwardly extending inlet pipe 68 and is supported by means of a lever 70 which pivots on a shaft 71 and is provided with an adjustable weight 72 for varying the pressure with which the applier 55 is forced upwardly against the film 59. A flexible conduit member, such as a hose 73, is connected to the pipe 68 and also to a pipe 74 which extends downwardly from a fluid container 75 having a bracket 76 for supporting a vessel 77 having a downwardly projecting outlet 78. In charging the device preparatory to operation on a film, the container 62 is filled with a desired solution to the established level 66, and another solution is poured into the container 75 until the liquid level 80 is produced therein. The vessels 64 and 77 are filled with proper solutions and are then placed in inverted positions on the brackets 63 and 76, as shown in Fig. 6. As the film 59 is moved between the appliers 55 and 56, the solutions are applied to the surfaces or emulsions thereof, this tending to produce a reduction in the liquid levels 66 and 80. As soon as these liquid levels drop sufficiently to permit air to enter the outlets 65 and 78 of the respective vessels 64 and 77, sufficient fluid will drain from each of the vessels to bring the liquid levels 66 and 80 to their normal positions. By use of the vessels 64 and 77 the liquid levels 66 and 80 may be maintained substantially constant, thereby producing substantially constant hydrostatic heads in the liquids delivered to the pervious walls 57 and 58 of the appliers 55 and 56. By raising or lowering the container 75, the hydrostatic head of the liquid in the applier 55 may be varied to give a desired feed of fluid through the permeable or pervious wall 57 to the surface of the film 59, but when the hydrostatic head of the fluid is determined or set, the vessel 77 will operate to maintain it substantially constant by preserving a substantially fixed liquid level 80. This feature of controlling and maintaining a desired feeding pressure on the liquid may be employed in conjunction with any of the devices shown in Figs. 1 to 6.

In the practice of my invention it may be desirable to employ solutions which should be kept in a thoroughly mixed condition. I have found that in the use of a pervious wall for applying a toning or dyeing solution to a film, the dye will be absorbed by the film faster than the metallic salts which are used in conjunction with the dye in a coloring solution. Therefore, it is desirable to keep the solution in constant circulation so as to maintain therein a proper proportion of the constituent elements. In Fig. 7 I show a form of apparatus embodying my invention in which the treating solutions will be kept in constant circulation but will at the same time be maintained under proper pressure for producing a desired feeding of the solutions to the film which is being treated. In Fig. 7 I show upper and lower appliers 82 and 83 each including a chamber member 84 supporting a pervious wall 85 in position to engage the face of a film 86. Associated with each applier 82 and 83 is a fluid reservoir 87 having a pump 88 which forces a substantially continuous flow of solution through piping 89 into one side of an associated applier 82 or 83. Each of the appliers 82 and 83 is provided with a swingable or adjustable pipe 91 which may be raised or lowered, as indicated by dotted lines 92, to vary the hydrostatic head or pressure on the fluid in the chamber members 84. As shown in Fig. 7, the outlet members 91 may be so placed as to discharge into their respective containers 87, as indicated by arrows 93. The pumps 88 are shown as centrifugal or constant flow type, but small reciprocating pumps may be employed if it is desired to produce a pulsating effect in the feeding of the fluids to the pervious walls 85. In this form of the invention the fluid is kept in constant circulation and is accordingly kept in a thoroughly mixed condition so as to maintain the operation of the device at highest efficiency.

In Fig. 8 I show my invention embodied in a device having an applier 100 equipped with a pervious wall 101 adapted to apply fluid to a film 102, and a remover 103 for removing from the face of the film such surplus fluid as may adhere thereto after it leaves the applier 100. The applier 100 is shown with a resrvoir 104 and a pump 105 for circulating the fluid through piping 106. The applier 100 is equipped with an adjustable overflow member 107 functioning in the manner of the outlet pipes 91 of Fig. 7. The remover 103 includes a hollow body 108 which supports a perforate, penetrable, or pervious wall 110 in the upwardly disposed opening 111 thereof. Connected with the interior space 112 of the remover 103 is a suction pump 113 adapted to exert a constant suction so as to draw off fluid which is collected in the wall 111 and to cause the wall 111 to readily absorb the fluid from the surface of the film 102 as it is moved over the members 101 and 103 by means of a pulling sprocket 115. This form of the invention is especially suited for film treatments where it is desired to profusely apply the treating solution to the surface or emulsion of the film, which may be accomplished by increasing the pressure of fluid within the applier 100 in order to cause the fluid to ooze through the permeable wall 101 in ample quantity. The surplus fluid is removed by the remover 103 which may be placed immediately adjacent to the applier 100 or at a distance therefrom so as to leave the coating of solution on the film for a period of time sufficient to accomplish a desired treatment.

The most important use which I at present find for my invention is in the coloring of double coated positive film in the production of a colored motion picture positive, and in its use I find that I am able to obtain very pronounced or vivid coloring effects. In the use of a solution containing metallic salts and dye I find that the proportion of the dye absorbed is greater than the proportion of metallic constituents absorbed, as compared with the method of coloring by dipping the film into a solution.

I claim as my invention:

1. A film treating device of the character described, including: means for moving a film through a path of movement; an applier having a pervious wall structure engaging said film as it travels through said path, and walls forming a space communicating with said pervious wall structure; and means for circulating a fluid through said space so as to saturate said pervious wall structure.

2. A film treating device of the character described, including: means for moving a film through a path of movement; an applier having a pervious wall structure engaging said film as it travels through said path, and walls forming a space communicating with said pervious wall structure; and means for circulating a fluid through said space under substantially constant pressure so as to produce a positive and controlled penetration of said fluid into said pervious wall structure.

3. A film treating device of the character described, including: means for moving a film through a path of movement; an applier having a pervious wall structure engaging said film as it travels through said path, and walls forming a space communicating with said pervious wall structure; means for circulating a fluid through said space; and means for automatically controlling the pressure of said fluid in said space.

4. A film treating device of the character described, including: means for moving a film through a path of movement; an applier having a pervious wall structure, said pervious wall structure including material of capillary character and a surface structure of permeable material for engaging and applying fluid to said film as it travels through said path, and walls forming a space communicating with said pervious wall structure; means for feeding a fluid through said space to said pervious wall structure under controlled constant pressure; and means for holding said film and said pervious wall structure together with pressure.

5. A film treating device of the character described, including: means for moving a film through a path of movement; an applier having a pervious wall structure, said pervious wall structure including material of capillary character and a surface structure of permeable material for engaging and applying fluid to said film as it travels through said path, and walls forming a space communicating with said pervious wall structure; and means for circulating a fluid through said space so as to saturate said pervious wall structure.

6. A film treating device of the character described, including: means for moving a film through a path of movement; an applier having a pervious wall structure engaging said film as it travels through said path, and walls forming a space communicating with said pervious wall structure; means for circulating a fluid through said space; and means for maintaining a substantially constant static head in the fluid in said space.

7. A film treating device of the character described, including: means for moving a film through a prescribed path of movement; an applier situated along said path of movement, said applier consisting of a wall member forming a chamber having an opening adjacent to the face of said film, and a body of fibrous material adapted to make clamping engagement with the surface of said film, the fibrous structure of said body of material being such that a liquid may penetrate therethrough; a container for a reserve supply of liquid; means for connecting said container to the interior of said wall member; and means for maintaining a constant pressure on the liquid in said wall member.

8. A film treating device of the character described, including: means for moving a film through a path of movement; an applier having a pervious wall structure engaging said film as it travels through said path, and walls forming a space communicating with said pervious wall structure, said space being adapted to contain a liquid in contact with said pervious wall structure; and means following said applier for removing surplus liquid from the surface of said film, said removing means including a body of pervious material held in engagement with said film, and means for exerting a suction on said body of pervious material to draw off fluid which has been removed from said film.

9. A film treating device of the character described, including: means for moving a film through a path of movement; an applier having a pervious wall structure engaging said film as it travels through said path, and walls forming a space communicating with said pervious wall structure, said space being adapted to contain a liquid in contact with said pervious wall structure; means following said applier for removing surplus liquid from the surface of said film, said removing means comprising a body of permeable material adapted to engage the surface of said film, and walls forming a chamber having an opening in which said body of permeable material is supported; and an exhauster connected with said chamber for exerting a suction on said body of permeable material.

10. A film treating device of the character described, including: means for moving a film through a prescribed path of movement; an applier situated along said path of movement, said applier consisting of a wall member forming a chamber having an opening adjacent to the face of said film, and a body of fibrous material adapted to make wiping engagement with the surface of said film, the fibrous structure of said body of material being such that a liquid may penetrate therethrough; a container for a reserve supply of liquid; a pump for feeding liquid from said container to said chamber; and an overflow means connected to said chamber having its outlet at such height that a pressure will be maintained on the liquid in said chamber.

11. A film treating device of the character described, including: means for moving a film through a prescribed path of movement; an applier situated along said path of movement, said applier consisting of a wall member forming a chamber having an opening adjacent to the face of said film, and a body of fibrous material adapted to make wiping engagement with the surface of said film, the fibrous structure of said body of material being such that a liquid may penetrate therethrough; a container for a reserve supply of liquid; a pump for feeding liquid from said container to said chamber; and an overflow means connected to said chamber having its outlet adjustable in height so as to create a desired pressure in the liquid in said chamber.

LOREN E. TAYLOR.